(12) United States Patent
Buechner et al.

(10) Patent No.: US 12,449,104 B2
(45) Date of Patent: Oct. 21, 2025

(54) HEADLIGHT FOR A MOTOR VEHICLE

(71) Applicant: HELLA GmbH & Co. KGaA, Lippstadt (DE)

(72) Inventors: Arnd-Claus Buechner, Lippstadt (DE); Frank Grueter, Lippetal (DE); Wolf Alexander Quitsch, Beckum (DE); Peter Rausch, Muenster (DE); Martin Rode, Braunschweig (DE); Burkhard Topp, Soest (DE); Mario Zehanciuc, Bueren (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/784,922

(22) Filed: Jul. 26, 2024

(65) Prior Publication Data

US 2024/0384848 A1 Nov. 21, 2024

Related U.S. Application Data

(63) Continuation of application No. PCT/EP2023/050272, filed on Jan. 9, 2023.

(30) Foreign Application Priority Data

Jan. 26, 2022 (DE) ..................... 10 2022 101 792.3

(51) Int. Cl.
*F21S 41/153* (2018.01)
*B60Q 1/14* (2006.01)
(Continued)

(52) U.S. Cl.
CPC .............. *F21S 41/153* (2018.01); *B60Q 1/14* (2013.01); *F21S 41/143* (2018.01); *F21S 41/25* (2018.01);
(Continued)

(58) Field of Classification Search
CPC ........ F21S 41/153; F21S 41/143; F21S 41/25; F21S 41/285; B60Q 1/14; F21W 2102/135
See application file for complete search history.

(56) References Cited

U.S. PATENT DOCUMENTS

| 10,054,279 B2 | 8/2018 | Kliebisch |
| 2013/0194816 A1 | 8/2013 | Hager et al. |

(Continued)

FOREIGN PATENT DOCUMENTS

| CN | 209026719 U | 6/2019 |
| DE | 102008036193 A1 | 2/2010 |

(Continued)

OTHER PUBLICATIONS

International Search Report for International Application PCT/EP2023/050272 mailed Apr. 14, 2023.

*Primary Examiner* — Elmito Breval
(74) *Attorney, Agent, or Firm* — Muncy, Geissler, Olds & Lowe, P.C.

(57) ABSTRACT

A headlight for a motor vehicle, comprising a first luminous surface, wherein the headlight is configured so that light emanates from the first luminous surface and is used to generate a high-beam light distribution. A second luminous surface is provided such that light emanates from the second luminous surface and is used to generate a forefield portion of a low-beam light distribution. Projection optics are configured so as to project light emanating from the first and second luminous surface into an area around the motor vehicle.

11 Claims, 3 Drawing Sheets

(51) Int. Cl.
*F21S 41/143* (2018.01)
*F21S 41/20* (2018.01)
*F21S 41/25* (2018.01)
*F21W 102/135* (2018.01)

(52) U.S. Cl.
CPC ...... *F21S 41/285* (2018.01); *F21W 2102/135* (2018.01)

(56) References Cited

U.S. PATENT DOCUMENTS

2017/0350568 A1    12/2017  Hager et al.
2019/0086050 A1     3/2019  Dikua et al.

FOREIGN PATENT DOCUMENTS

| DE | 202011103805 U1 | 1/2012 |
| DE | 102010041096 A1 | 3/2012 |
| DE | 102010056313 A1 | 6/2012 |
| DE | 102015104514 A1 | 9/2016 |
| DE | 102015224745 A1 | 6/2017 |
| DE | 102016109132 A1 | 11/2017 |
| DE | 102017105888 A1 | 9/2018 |
| DE | 102014226650 A1 | 6/2023 |
| EP | 3056803 A1 | 8/2016 |
| EP | 3343091 A1 | 7/2018 |
| EP | 3379142 A1 | 9/2018 |
| EP | 3885643 A1 | 9/2021 |

HEADLIGHT FOR A MOTOR VEHICLE

This nonprovisional application is a continuation of International Application No. PCT/EP2023/050272, which was filed on Jan. 9, 2023, and which claims priority to German Patent Application No. 10 2022 101 792.3, which was filed in Germany on Jan. 26, 2022, and which are both herein incorporated by reference.

BACKGROUND OF THE INVENTION

Field of the Invention

The present invention relates to a headlight for a motor vehicle.

Description of the Background Art

Compact, pixelated light sources with small distances between the illuminating surfaces even today enable the realization of very compact module concepts. Corresponding module concepts are also referred to as SSL technology. By directly projecting the illuminated surface into the traffic area, the desired light distribution, such as, for example, a glare-free high beam (ADB), can be realized without having to manipulate the light image with the aid of a primary optic. An example of such a light module can be found in DE 10 2017 105 888 A1. Only one lens is arranged there between the light-emitting diodes (LEDs), arranged in a matrix, and the projection optics. The extensive dispensing with a primary optic allows the optical system to be realized in a significantly smaller installation space with a simultaneously higher efficiency. At the same time, the number of variants can be limited, because the light distribution can be adapted software-based to the respective homologation areas using pixelation.

However, such compact concepts are only known for high-beam light distributions. Compact solutions for realizing a full light distribution, formed of a low beam and a high beam, from one module would be desirable in order to exploit the installation space and efficiency advantages of SSL technology in particular. Depending on the pixelation, current concepts, based on SSL technology, allow the implementation of high-beam functionalities and, if necessary, of a portion of the range of a low-beam light distribution. To implement a full light distribution, a second module has to be used so far that either generates a full low beam or, for example, at least generates the forefield portion and the cut-off line of a low-beam light distribution.

Concepts currently available for generating high-beam and low-beam light distributions in one module use elaborately designed primary optics to preform the light distribution. An example of such a headlight can be found in DE 10 2016 109 132 A1, which corresponds to US 2019/0086050, which is incorporated herein by reference.

In the conventional art, associated disadvantages are a high installation space requirement, in particular a large installation depth due to the necessary optical path, a comparatively low efficiency of the system due to the optical efficiency of the primary optics, a wide range of variants due to the adaptation of the primary optics for different homologation areas, as well as a high development effort or a long development time, for example, for a plurality of different optics of a module for different vehicles, and thus increased development costs. The disadvantages of current systems are thus clearly inconsistent with the future trends of the automotive market: high cost pressure, shorter development times, smaller installation spaces in the headlight, and a focus on efficiency in the context of electrification.

SUMMARY OF THE INVENTION

It is therefore an object of the present invention to provide a headlight that can generate a full light distribution, formed of a low beam and a high beam, from a compact module.

According to an example, the headlight comprises a first luminous surface, wherein the headlight is configured so that light emanates from the first luminous surface and is used to generate a high-beam light distribution, a second luminous surface, wherein the headlight is configured so that light emanates from the second luminous surface and is used to generate a forefield portion of a low-beam light distribution, and projection optics configured so as to project light emanating from the first and second luminous surfaces into the area around the motor vehicle.

This makes it possible to realize a compact module that can generate a full light distribution formed of a low beam and a high beam. The inventive design can have the advantages of SSL technology such as, in particular, a small installation space, high efficiency, the reduction of variants, lower logistics costs, faster development times, lower development costs, and synergy effects resulting from the use of identical parts for different vehicle types. In particular, the inventive design allows technical compatibility with currently used SSL concepts, but also with SSL|HD concepts in the future.

It may be provided that the first luminous surface can be arranged in the same plane as the second luminous surface, in particular wherein the plane in which the first and second luminous surfaces are arranged corresponds to the image plane of the projection optics. In particular, the first luminous surface and the second luminous surface can have a distance between 0 μm and 200 μm from one another in the plane of the luminous surfaces. By arranging the first luminous surface and the second luminous surface in the image plane of the projection optics, the light distribution to be generated in the area around the vehicle is realized there.

It is possible for luminous segments to be arranged in the form of a matrix on the first luminous surface for the targeted generation of pixels of a high-beam light distribution. The adjacent luminous segments on the first luminous surface can have a distance between 0 μm and 100 μm from one another. Furthermore, the luminous segments on the first luminous surface can be designed as light-emitting diodes or laser diodes, in particular wherein the first luminous surface corresponds to the active area of a solid-state LED array. The solid-state LED array can also be an SSL HD LED.

It may be provided that the headlight is configured so that the light emanating from the first luminous surface is used not only to generate a high-beam light distribution, but also to generate a portion of the range of a low-beam light distribution and/or to generate a cut-off line of a low-beam light distribution.

It is possible that the second luminous surface is configured to have a luminance that varies over the surface. In this case, during operation of the headlight, the luminance on the second luminous surface can have different gradients in two mutually perpendicular directions. In this way, a low-beam light distribution or at least the forefield portion of a low-beam light distribution on the second luminous surface can be specified and projected into the area around the vehicle by the projection optics.

It may be provided that the headlight comprises a plurality of light-emitting diodes the active areas of which together form the second luminous surface. In particular, the second luminous surface can also be formed by the active area of a solid-state LED array.

Further, it can be provided that the headlight comprises a converter or scatterer and at least one light-emitting diode, wherein the second luminous surface is formed by the converter or the scatterer and wherein the at least one light-emitting diode illuminates the converter or scatterer during operation of the headlight. As a result, light can be generated at a distance from the second luminous surface by the at least one light-emitting diode, the light of which is converted by the converter or scatterer into the desired distribution on the second luminous surface.

The headlight can comprise a plurality of light guides and at least one light-emitting diode, wherein the outcoupling surfaces of the light guides together form the second luminous surface. In this example as well, the light can be generated at a distance from the second luminous surface by the at least one light-emitting diode, the light of which passes through the light guides to the second luminous surface.

The headlight can comprise at least one primary optic or at least one reflector and at least one light-emitting diode, wherein the light exit surface of the at least one primary optic or of the at least one reflector forms the second luminous surface. In this example as well, the light can be generated at a distance from the second luminous surface by the at least one light-emitting diode, the light of which passes through the at least one primary optic to the second luminous surface or is reflected by the at least one reflector to the second luminous surface.

It is possible that the headlight is configured so that the light emanating from the second luminous surface is used not only to generate a forefield portion of a low-beam light distribution, but also to generate a portion of the range of a low-beam light distribution and/or to generate a cut-off line of a low-beam light distribution.

It can be provided that the first luminous surface is smaller than the second luminous surface.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
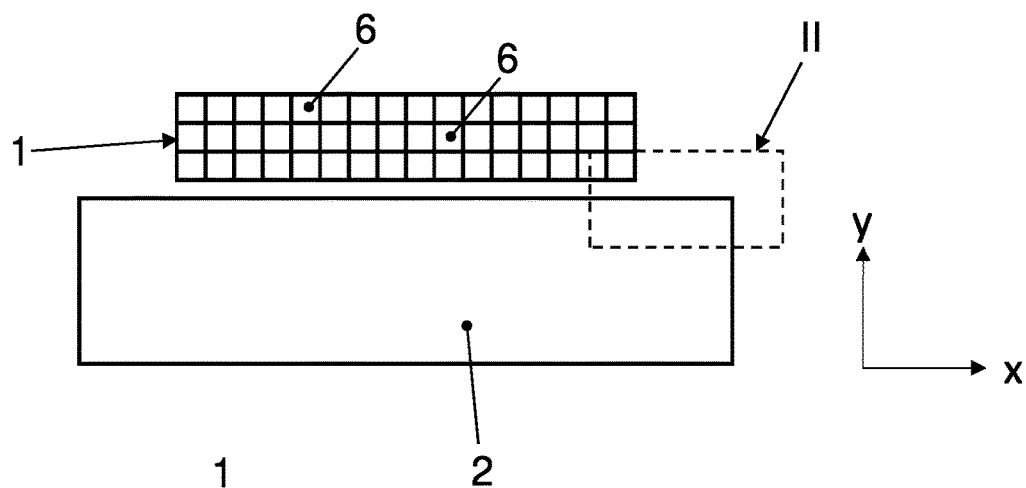
FIG. 1 shows a schematic top plan view of the luminous surfaces of a first example of a headlight of the invention.
Figure 2:
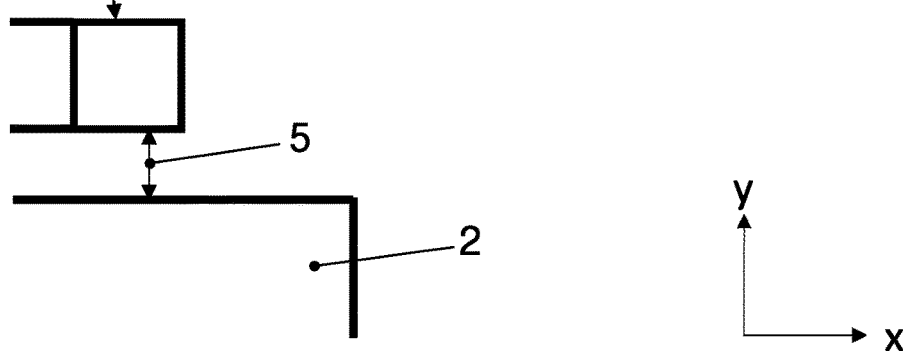
FIG. 2 shows a detail according to arrow II in FIG. 1.
Figure 3:
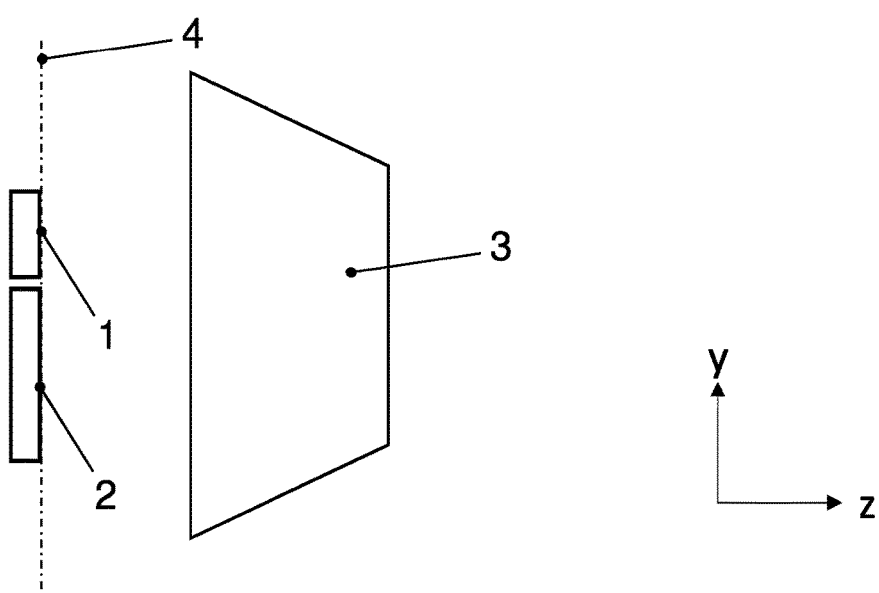
FIG. 3 shows a schematic side view of the example according to FIG. 1.

The examples of a headlight of the invention, partially illustrated in the figures, each comprise a first luminous surface 1, a second luminous surface 2 (see FIG. 1), and projection optics 3, only schematically indicated in FIG. 3. Luminous surfaces 1, 2 are arranged in a plane 4, which corresponds to the image plane of projection optics 3. First luminous surface 1 and second luminous surface 2 can have a distance 5 between 0 µm and 200 µm in plane 4 (see FIG. 2).

It can be seen from the figures that first luminous surface 1 is smaller than second luminous surface 2. It is entirely possible to make the two luminous surfaces the same size or to make second luminous surface 2 smaller than first luminous surface 1.

First luminous surface 1 is divided into luminous segments 6 in the form of a matrix. In this regard, neighboring luminous segments 6 on first luminous surface 1 have a distance to one another between 0 µm and 100 µm. In particular, first luminous surface 1 corresponds to the active area of a solid-state LED array 7 (see FIG. 5).

The solid-state LED array 7 forming first luminous surface 1 can be controlled in such a way that a luminance distribution is created on first luminous surface 1, the projection of which into the area around the motor vehicle with projection optics 3 creates a high-beam light distribution. Alternatively, the light emanating from first luminous surface 1 can be used not only to generate a high-beam light distribution, but also to generate a portion of the range of a low-beam light distribution and/or to generate a cut-off line of a low-beam light distribution.

Figure 5:
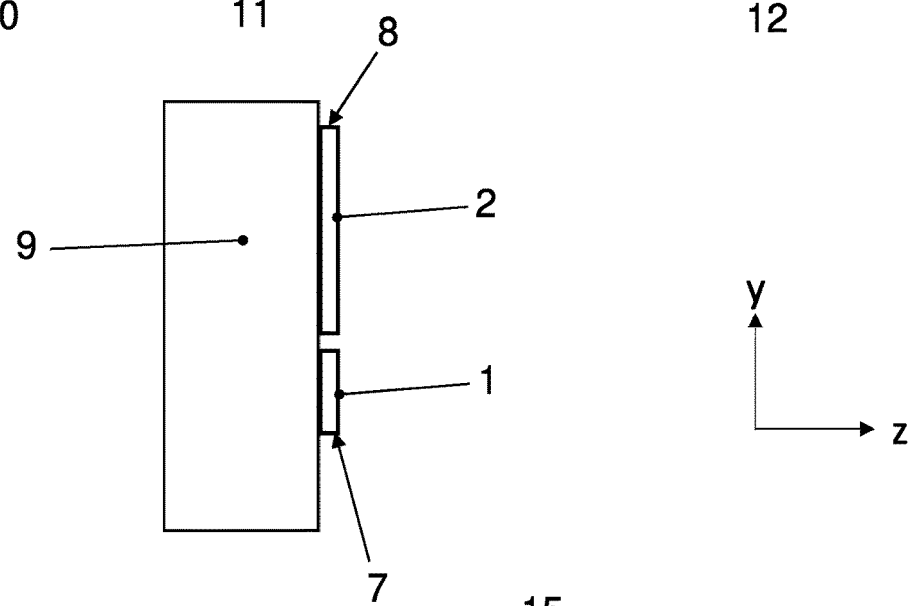
FIG. 5 shows a schematic side view of a second example of a headlight of the invention.

Second luminous surface 2 can also be divided into luminous segments in the form of a matrix. In this case, second luminous surface 2 can also correspond to the active area of a solid-state LED array 8. FIG. 5 illustrates an example in which both first luminous surface 1 and second luminous surface 2 are each formed by the active area of a solid-state LED array 7, 8, which are arranged on a common heat sink 9 and, in particular, are also arranged on a common printed circuit board.

Solid-state LED array 8 forming second luminous surface 2 can be controlled in such a way that a luminance distribution results on first luminous surface 2, the projection of which into the area around the vehicle with projection optics 3 results in at least a forefield portion of a low-beam light distribution. Alternatively, the light emanating from second luminous surface 2 can be used not only to generate a forefield portion of a low-beam light distribution, but also to generate a portion of the range of a low-beam light distribution and/or to generate a cut-off line of a low-beam light distribution.

Figure 4:
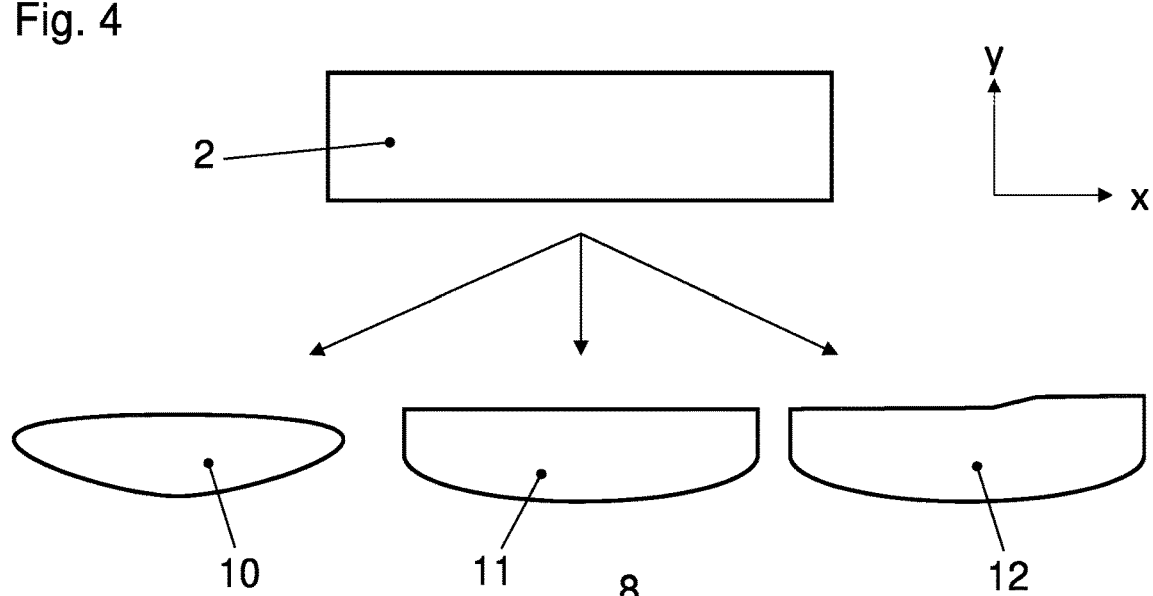
FIG. 4 shows a diagram to illustrate the design options of the second luminous surface of a headlight of the invention.

FIG. 4 illustrates these options. In the case shown on the left in FIG. 4, a luminance distribution can be generated on second luminous surface 2, the projection of which into the area around the vehicle results in forefield portion 10 of a low-beam light distribution. Alternatively, a luminance distribution can be generated on second luminous surface 2 in the case shown in the center of FIG. 4, the projection of which into the area around the vehicle results in a combination 11 of a forefield portion with a cut-off line of a low-beam light distribution. Alternatively, in the case shown on the right in FIG. 4, a luminance distribution can be generated on second luminous surface 2, the projection of which into the area around the vehicle results in a combination 12 of a forefield portion with a cut-off line and a portion of the range of a low-beam light distribution and thus a full low-beam light distribution.

Figure 8:
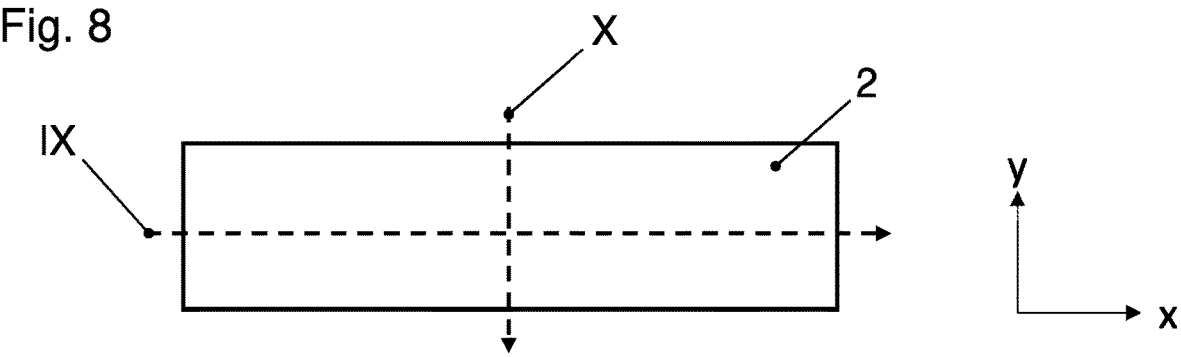
FIG. 8 shows a schematic top plan view of the second luminous surface of an example of a headlight of the invention.
Figure 9:
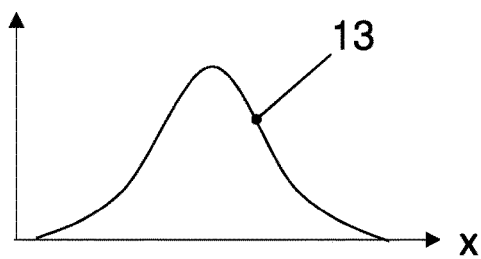
FIG. 9 shows the luminance along arrow IX in FIG. 8.
Figure 10:
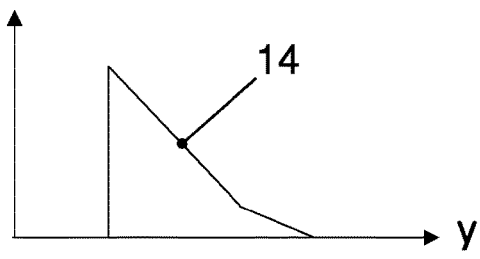
FIG. 10 shows the luminance along arrow X in FIG. 8.

Second luminous surface 2 can also be designed as a non-segmented luminous surface, which during operation has a luminance curve corresponding to the low-beam light distribution to be generated. FIG. 9 and FIG. 10 show the luminance curves 13, 14 in two mutually perpendicular directions x, y, which correspond to the arrows IX, X in FIG. 8. It can be seen that the luminance on second luminous surface 2 has different gradients in two mutually perpendicular directions.

Figure 6:
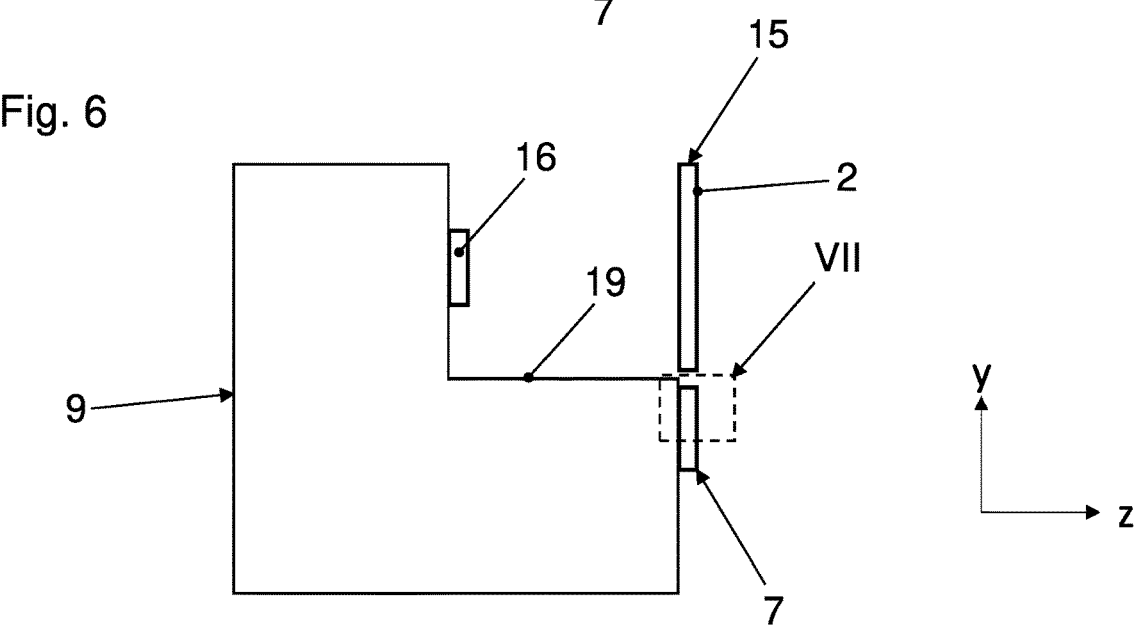
FIG. 6 shows a schematic side view of a third example of a headlight of the invention.

Second luminous surface 2, which is designed as a surface with a corresponding luminance curve, can be formed by an array of light-emitting diodes. However, it is also possible for the headlight to comprise converter 15 or scatterer and at least one light-emitting diode 16, wherein second luminous surface 2 is formed by converter 15 or the scatterer and wherein the at least one light-emitting diode 16 illuminates the converter or scatterer during operation of the headlight (see FIG. 6).

The at least one light-emitting diode 16 is spaced apart from converter 15 or scatterer. In this example as well, solid-state LED array 7, forming first luminous surface 1, and the at least one light-emitting diode 16, serving to illuminate the converter 15 or scatterer, can be arranged on the same heat sink 9. However, solid-state LED array 7 is arranged on a first printed circuit board 17 (see FIG. 7) and the at least one light-emitting diode 16 is arranged on a second printed circuit board, which is different from the first and which is offset to the left relative to first printed circuit board 17 in FIG. 6.

Figure 7:
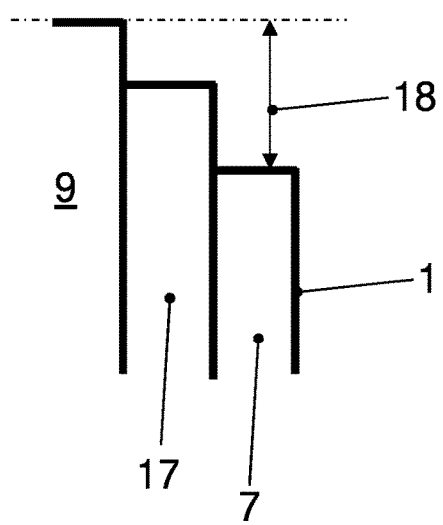
FIG. 7 shows a detail according to arrow VII in FIG. 6.

It is important here that distance 18 between the edge of heat sink 9 and solid-state LED array 7, forming first luminous surface 1, does not exceed 200 µm if possible (see FIG. 7). The at least one light-emitting diode 16 should also be placed close to step 19 formed in heat sink 9 (see FIG. 6).

Second luminous surface 2, which is designed as a surface with a corresponding luminance curve, can alternatively also be formed by the outcoupling surfaces of a plurality of light guides, into which the light of the at least one light-emitting diode 16 is coupled.

Second luminous surface 2, which is designed as a surface with a corresponding luminance curve, can alternatively also be formed by light exit surfaces of at least one primary optic or at least one reflector, wherein the light of the at least one light-emitting diode 16 passes through the at least one primary optic to second luminous surface 2 or is reflected by the at least one reflector to second luminous surface 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A headlight for a motor vehicle, the headlight comprising:
    a first luminous surface, wherein the headlight is configured so that light emanates from the first luminous surface and is used to generate a high-beam light distribution;
    a second luminous surface, wherein the headlight is configured so that light emanates from the second luminous surface and is used to generate a forefield portion of a low-beam light distribution;
    projection optics configured so as to project light emanating from the first and second luminous surfaces into an area around the motor vehicle; and
    a heat sink,
    wherein the first luminous surface corresponds to an active area of a solid-state LED array,
    wherein the second luminous surface is formed by a converter or a scatterer that is illuminated by at least one light-emitting diode during operation of the headlight,
    wherein the heat sink has a step to form a first mounting surface and a second mounting surface, the second mounting surface being offset from the first mounting surface by the step, and the first mounting surface and the second mounting surface being parallel to one another,
    wherein the first luminous surface is mounted on the first mounting surface of the heat sink and the at least one light-emitting diode is mounted on the second mounting surface of the heat sink,
    wherein the converter or the scatterer, that forms the second luminous surface, is arranged in a same plane as the first luminous surface.

2. The headlight according to claim 1, wherein the first luminous surface and the second luminous surface have a distance between 0 µm and 200 µm from one another in a plane of the first and second luminous surfaces.

3. The headlight according to claim 1, wherein luminous segments are arranged in a matrix on the first luminous surface for a targeted generation of pixels of a high-beam light distribution.

4. The headlight according to claim 3, wherein adjacent luminous segments on the first luminous surface have a distance between 0 µm and 100 µm from one another.

5. The headlight according to claim 3, wherein the luminous segments on the first luminous surface are light-emitting diodes or laser diodes.

6. The headlight according to claim 1, wherein the headlight is configured so that the light emanating from the first luminous surface is additionally used to generate a portion of a range of the low-beam light distribution and/or to generate a cut-off line of the low-beam light distribution.

7. The headlight according to claim 1, wherein the second luminous surface is configured to have a luminance that varies over the second luminous surface.

8. The headlight according to claim 7, wherein, during operation of the headlight, the luminance on the second luminous surface has different gradients in two mutually perpendicular directions.

9. The headlight according to claim 1, wherein the headlight is configured so that the light emanating from the second luminous surface is additionally used to generate a portion of a range of the low-beam light distribution and/or to generate a cut-off line of the low-beam light distribution.

10. The headlight according to claim 1, wherein the first luminous surface is smaller than the second luminous surface.

11. The headlight according to claim 1, wherein the first luminous surface is mounted on the first mounting surface of the heat sink via a first printed circuit board and the at least one light-emitting diode is mounted on the second mounting surface of the heat sink via a second printed circuit board.

* * * * *